July 29, 1924.
J. P. SMYTHE
WATER HEATER
Filed Oct. 27, 1919
1,502,802
2 Sheets-Sheet 1
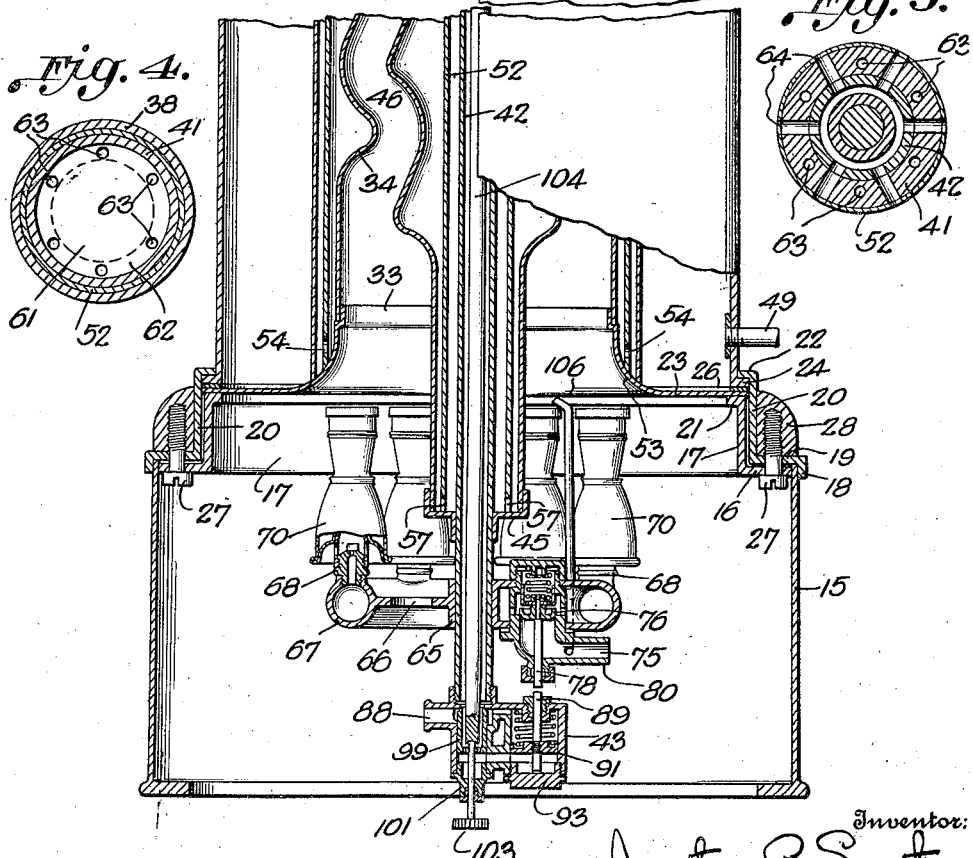

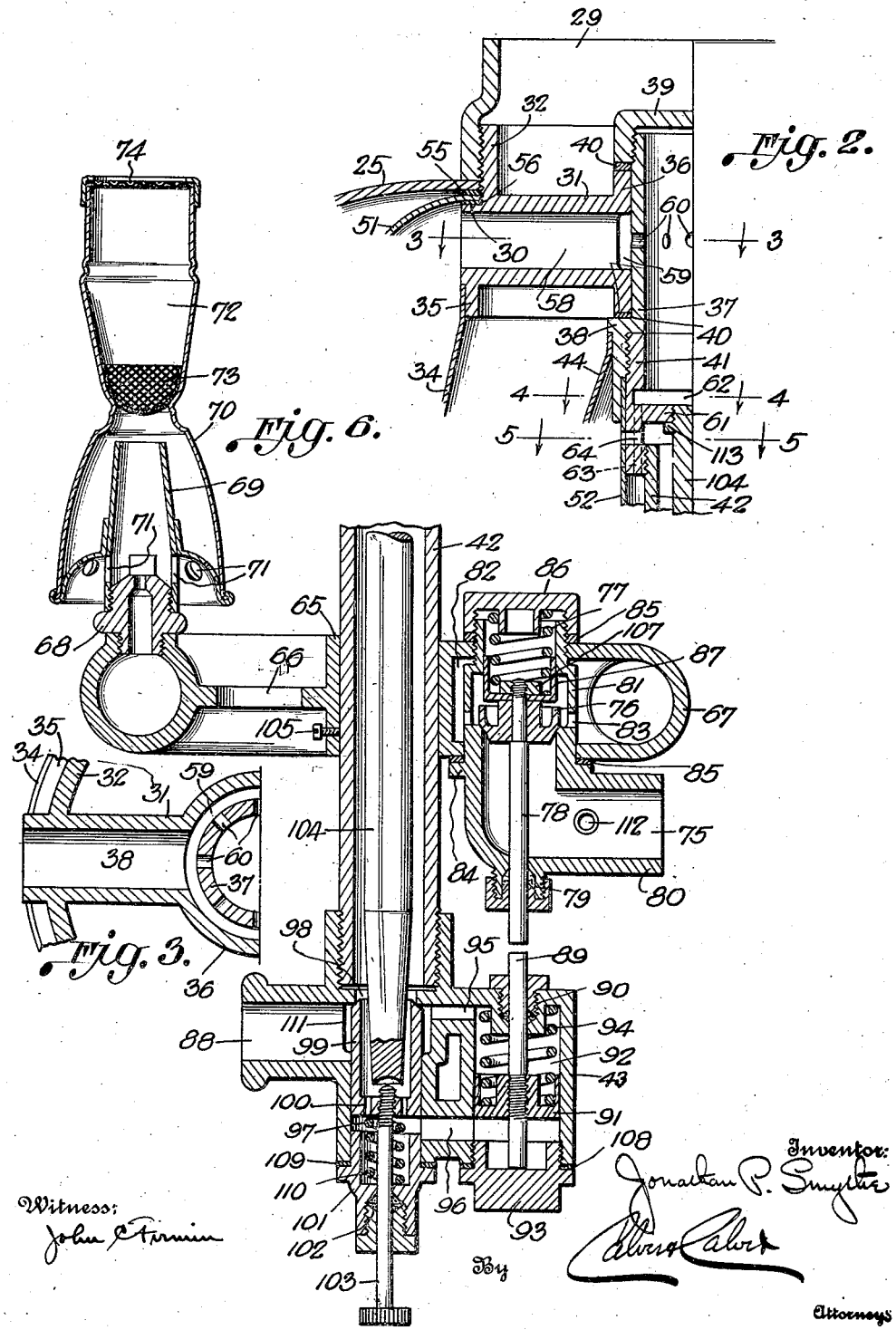

Patented July 29, 1924.

1,502,802

UNITED STATES PATENT OFFICE.

JONATHAN P. SMYTHE, OF WASHINGTON, DISTRICT OF COLUMBIA.

WATER HEATER.

Application filed October 27, 1919. Serial No. 333,767.

*To all whom it may concern:*

Be it known that I, JONATHAN P. SMYTHE, a citizen of the United States, residing at Washington, District of Columbia, have invented or discovered certain new and useful Improvements in Water Heaters, of which the following is a specification, reference being had therein to the accompanying drawings.

This invention relates to apparatus for heating water, and especially, although not exclusively, to "instantaneous" water heaters, so called, in which the heating means is automatically controlled by the flow of water through the apparatus in such a manner that, when water is drawn from the faucet, or is otherwise supplied for use, the heating means is rendered operative to heat said water, but when the flow of water is discontinued the operation of the heating means is suspended.

The invention has for an object to provide an automatic water heater having improved thermostatic means for automatically controlling the temperature of the water delivered, said controlling means being adjustable to permit said temperature to be varied at will, and operating to prevent the flow of water until heated to a predetermined minimum temperature, to cut off the flow of gas to the burner when the water reaches a predetermined maximum temperature, thereby preventing overheating, and to cause the flow of water to be automatically proportioned to the heat carried thereby.

A further object of the invention is to provide a water heater having improved gas valve controlling means especially adapted to co-operate with the thermostatic controlling means above referred to.

The foregoing and other objects of the invention, together with means whereby the same may be carried into effect, will best be understood from the following description of one form or embodiment thereof illustrated in the accompanying drawings. It will be understood, however, that the particular construction described and shown has been chosen for illustrative purposes merely, and that the invention, as defined by the claims hereunto appended, may be otherwise embodied without departing from the spirit and scope thereof.

In said drawings:

Fig. 1 is a view, partly in elevation and partly in substantially central vertical section, of the complete apparatus.

Fig. 2 is an enlarged detail view in vertical section showing the construction of the upper part of the heater.

Figs. 3, 4 and 5 are sections on the lines 3—3, 4—4, and 5—5, respectively, Fig. 2.

Fig. 6 is an enlarged vertical section of the lower portion of the apparatus showing one of the burners, the pressure controlled gas valve, and the thermal valve.

The invention is herein illustrated as embodied in a water heater of the general type shown and described in Letters Patent Nos. 1,163,787 and 1,198,675, granted to me December 14, 1915, and September 19, 1916, respectively.

In the construction shown, the upper edge of the usual burner housing 15, which is preferably composed of suitable sheet metal, is clamped between the outer edge of an outwardly turned flange 16 of a ring 17 and an annular rim 18 on an outwardly turned flange 19 on a similar ring 20 surrounding the ring 17. The rings 17 and 20 are formed at their upper edges with inwardly turned flanges 21 and 22, respectively, between which are clamped the edge of circular disk 23 and the outwardly turned lower edge 24 of the main heater casing 25, also preferably composed of sheet metal, a suitable packing ring 26 being preferably interposed between said parts. The rings 17 and 20 are secured together to clamp between them the edges of the burner housing 15, disk 23, and casing 25 by means of cap screws 27 which pass through the flanges 16 and 19 and are in threaded engagement with an annulus 28 superimposed on the flange 19. The upper edge of the casing 25 is turned inwardly and is clamped between the lower end of a flue nipple 29 and an annular shoulder 30 on a ring 32 in threaded engagement with said flue nipple and connected by hollow arms 31 with a hub 36. The disk 23, which constitutes a partition between the burner housing and the casing, is formed with a central opening the edges of which are spun upwardly to constitute an inclined portion 53 and an upright annular flange 33. Brazed or otherwise secured to the upper edge of the flange 33 is the lower edge of an annular partition 34 the upper edge of which is similarly secured to an offset portion of the ring 32. The hub 36 is seated on a thimble 37 between a shoulder or offset portion 38 thereof and a threaded cap 39 closing the upper end of said thimble, suitable packing rings 40 being interposed between said hub and said shoulder and cap, respectively. The offset lower end 38 of the thimble 37 is in threaded engagement with the upper end of a second thimble 41 to the lower end of which is threaded the upper end of a central outflow tube 42 which extends downwardly through the opening in the disk 23 and into the burner housing 15, where it is connected with a casing 43, having an outlet 88 leading to the faucet (not shown). Brazed or otherwise secured to the exterior of the lower end portion 38 of the thimble 37 is the upper end of a second annular partition 44, the lower end of which is similarly secured to a collar 45 fast on the outflow tube 42 within the burner housing 15.

The partition 44 is spaced from and disposed concentric with the partition 34 within the same, and said partitions enclosed between them a relatively thin or narrow, upright, annular flue 46 or passage for the heated product of combustion, said flue or passage communicating at its lower end, through the opening in the disk 23, with the interior of the burner housing 15, and at its upper end, through the spaces between the arms 31, with the flue nipple 29. In order that the maximum amount of heat may be extracted from the combustion gases during their passage through the flue 46, the partitions 34 and 44 are formed with complementary annular corrugations which give to said flue a tortuous form.

At opposite sides of the flue 46 are outer and inner, concentric, annular water chambers 47 and 48, the former lying between the partition 34 and the casing 25 and being supplied with water by an inlet pipe 49 in threaded engagement with said casing adjacent the bottom thereof, and the latter lying between the partition 44 and the outflow tube 42 and communicating with the chamber 47 and with said outflow tube by means hereinafter described. The outer water chamber 47 is divided into several concentric portions by spaced annular baffles 50 and 51, while the inner water chamber 48 is similarly divided into concentric portions by an annular baffle 52. The baffle 50 rests at its lower edge upon, and is supported and positioned by, the inclined portion 53 of the disk 23, and is of such a height as to terminate a short distance below the top of the casing 25. The baffle 51 is similarly supported and positioned at its lower edge by the inclined portion 53 of the disk 23, being formed adjacent said lower edge with a series of apertures 54.

The upper edge of said baffle 51 is turned inwardly and is clamped between the inwardly turned upper edge of the casing 25 and the shoulder 30 of the ring 32, packing rings 55 and 56 (Fig. 2) being preferably interposed between the casing 25 and baffle 51 and between the baffle 51 and the shoulder 30, respectively. The baffle 52 is clamped at its upper edge between the thimble 41 and the lower portion 38 of the thimble 37, and the lower edge thereof rests upon the collar 45, said lower edge being formed with a series of apertures 57. The portion of the outer water chamber 47 between the baffle 51 and the partition 34 communicates at its upper end, through passages 58 in the arms 31, with an interior groove or annular chamber 59 (Figs. 2 and 3) formed in the hub 36. Said chamber 59 communicates through a series of radial apertures 60 formed in the thimble 37 with the interior of the latter which, in turn, communicates with the top of the thimble 41. The latter thimble is formed intermediate its ends with a transverse web or partition 61 (Figs. 2 and 4) and immediately above said web with an annular groove 62 with which communicates a series of ports 63 (Figs. 2, 4, and 5) extending to the lower end of the thimble 41 and there communicating with the portion of the inner water chamber 48 between the baffle 52 and the outflow tube 42. The portion of said inner water chamber between the partition 44 and baffle 52 communicates with the interior of the outflow tube 42 through a series of radial ports 64 (Figs. 1, 2, and 5) formed in said baffle and in the thimble 41 between the ports 63 and located above the upper end of said outflow tube.

Water, entering the space between the casing 25 and the baffle 50 from the inlet pipe 49, rises in said space until it overflows the upper edge of said baffle, thence flows downwardly in the space between the baffles 50 and 51 and through the apertures 54 to the space between the baffle 51 and partition 34 in which it rises until it reaches the passages 58 through which it flows to the chamber 59 and thence through the ports 60 to the interior of the thimbles 37 and 41. From the interior of the latter thimble said water flows, through the groove 62 and ports 63, to the space between the baffle 52 and outflow tube 42, and thence, through the apertures 57, to the space between the baffle 52 and partition 44, in which it rises and from which it finally flows, through the ports 64, to the outflow tube 42.

It will thus be seen that the water is caused to flow, from the outer portion of the casing to the central outflow tube, successively through a series of concentric annular spaces or jackets, through several of which it is obliged to pass before reaching the heated walls of the heating flue, thereby preheating the water, preventing cold water from coming into contact with said walls, and avoiding water of condensation and the formation of carbon monoxide gas in the flue. It will also be seen that the outer water space between the casing 25 and baffle 50, which, as shown, is preferably relatively wide in proportion to the other spaces, is at all times filled with relatively cold water, which serves to insulate the exterior of the casing from the hot interior thereof, thereby not only preventing the outer casing from becoming unduly heated, but conserving the heat and utilizing the same in a more efficient manner. It will further be seen that, by providing water chambers 47 and 48 at both sides of the relatively narrow, tortuous, annular heating flue 46, the heat is further conserved and utilized with the greatest efficiency and caused to pass twice in contact with said flue, and with both walls thereof successively, the flow being in the natural upward direction in each instance, thereby effectually extracting all of the available heat from the combustion gases whose flow is somewhat retarded by the corrugated and tortuous form of the flue. It will furthermore be seen that the foregoing results are accomplished by means of a construction which is relatively simple, compact, inexpensive, and easy to assemble.

Secured, as by a set screw 105 (Fig. 6) to the outflow tube 42 within the burner housing 15, is a hub 65 supporting, by means of a suitable perforated web 66, or otherwise a hollow gas ring 67 carrying a circular series of burners. As shown in Fig. 6, each of said burners is connected with said gas ring by a nipple 68 supporting and communicating with a gas nozzle 69 which, in turn, supports and extends into the burner shell 70, said nozzle and shell having the usual air inlet ports 71. The shell 70 extends for a considerable distance above the upper end of the nozzle 69 to provide a mixing chamber 72 which is preferably of less cross-sectional area at its lower end immediately above the nozzle 69 than at its upper end at which the combustion takes place. Within the narrow lower end of the mixing chamber 72 is placed a piece of woven wire gauze 73, while at the upper end of said chamber, and spaced by the length thereof from the gauze 73, is a second piece of similar gauze 74.

The gas and air entering through the nozzle 69 and ports 71 pass upwardly through the gauze 73, mixing chamber 72 and gauze 74 above which the combustion takes place. The upper or outer gauze 74, by maintaining the combustion point above the upper end of the burner shell 70 and at a considerable distance from the nozzle 69, effectually prevents the burner from striking back and also prevents the shell from burning out due to excessive heating thereof. The inner gauze 73 operates to promote the intimate mixture of the air and gas before reaching the point of combustion, and also serves as an additional safeguard to prevent the flame from reaching the nozzle, or striking back, in the event of said flame inadvertently passing the outer gauze 74. The mixing chamber 72, in addition to providing a space for the thorough intermingling of the air and gas, serves also as a pressure equalizing chamber, while the two gauzes tend to retard and prevent the too rapid flow of gas under sudden rises in pressure. The effect, therefore, of the construction as a whole is to produce a more nearly perfect combustion of the gas with less heating of the burner structure, and a more constant and gentle flame than are obtained by the use of any similar burner of which I am aware and in which the usual single gauze is employed.

Gas is supplied to the ring 67 from the main or other suitable source through an inlet 75 under the control of a reciprocating valve 76, closed by a spring 77 and having a stem 78. The gas inlet 75 comprises an elbow having a lateral or horizotnal connection portion 80, a stuffing box 79 through which the valve stem 78 extends, and an upright portion 81 extending vertically through a hollow lateral extension 82 of the gas ring 67 and having, within said extension, a seat for the valve 76, and, beyond said valve seat, ports 83 communicating with the interior of said extension. The upright portion 81 is formed with a shoulder or flange 84 below the extension 82 and with a threaded upper end to receive a cap 86 above said extension, suitable packing rings 85 being preferably interposed between said extension and said flange and cap, respectively. The spring 77 bears at its upper end on the cap 86 and at its lower end upon a guide thimble 87 secured to the valve 76, as by means of a nut 107 on the threaded upper end of the valve stem 78. It will be seen that the construction described provides a swivelled joint between the gas inlet and the gas ring, whereby the connection portion 80 may be turned at any angle for convenient connection with a supply pipe extending from any direction, and also permits the ready removal of the valve for inspection or repair.

Co-operating with the valve stem 78 is an alined stem 89 which extends through a stuffing box 90 at the top of the casing 43 and is connected to a piston 91 loosely fitting a cylinder 92 formed in said casing 43 and closed at its lower end by a cap 93 preferably provided with a suitable gasket 108. The stem 89 is normally held with its lower end in engagement with the cap 93, and with its upper end out of engagement with the lower end of the valve stem 78, by a spring 94 interposed between the piston 91 and the upper end of the cylinder 92. The upper and lower ends of the cylinder 92 communicate, through passages 95 and 96, respectively, with the upper and lower ends of a second cylinder 97, also formed in the casing 43, and communicating with the water outlet 88. The cylinder 97 is disposed with its axis parallel with the axis of the cylinder 92 and in alinement with the axis of the outflow tube 42 with which it communicates through a port 98 controlled by a thermally-controlled piston valve 99 guided in said cylinder 97 and provided with one or more leakage ports 100. The lower end of the cylinder 97 is closed by a cap 101 provided with a gasket 109 and having a stuffing box 102 through which extends the stem of an adjusting screw 103 having its upper end in threaded engagement with the head of the thermal valve 99 and extending slightly above the same. The valve 99 is normally held seated to close the port 98 by means of a spring 110 interposed between said valve and the cap 101. The cylinder 97 is slightly enlarged at its upper end, as shown at 111, to form an annular chamber surrounding the valve 99 and communicating with the passage 95. Disposed co-axially of the outflow tube 42 is a thermal rod 104 supported at its upper end by threaded engagement with the web 61 of the thimble 41 (Figs. 1 and 2) and longitudinally positioned by engagement of a flange 113 thereon with said web. The lower end of said thermal rod is extended through the port 98 and into the valve 99 (which is chambered to receive it) but normally out of engagement with the end of the adjusting screw 103, as shown in Fig. 6.

When the gas valve 76 is opened, as hereinafter explained, to admit gas to the ring 67 and thence to the gas burners, said burners are lighted by a pilot jet 106 (Fig. 1) which communicates with the gas inlet 75 through a port 112 (Fig. 6). Said pilot jet is preferably directed across the top of one of the burners and against the outer wall of the inner water chamber 48, so as to keep the water in the latter slightly warm when the apparatus is not in use, thereby conserving the heat and expediting the operation when the water is turned on at the faucet.

Assuming the apparatus to be filled with water under the pressure of the main admitted through the inlet pipe 49, and the outlet faucet to be closed, the position of the parts will be as shown in Fig. 6. The pressure in the outflow tube 42 causes the water to find its way through the leakage ports 100 in the thermal valve 99 and about the loosely fitting piston 91, equalizing the pressures on the upper and lower sides of said piston, permitting the spring 94 to hold the same in the lowermost position, and consequently permitting the gas valve 76 to be seated under the influence of its spring 77, so that flow of gas to the burners will be prevented. The effective pressure areas of the upper and lower sides of the valve 99 being substantially equal, the spring 110 will hold said valve seated to close the port 98. When the faucet is opened, the pressure will be relieved in the water outlet 88, chamber 111, passage 95, and the upper end of the cylinder 92, causing the piston 91 to move upwardly, carrying with it the stem 89 which engages the valve stem 78 and unseats the gas valve 76, admitting gas to the burners. The thermal valve 99, however, remains closed, preventing flow of water from the outflow tube 42 to the faucet. When, however, the temperature of the water in the outflow tube rises, the consequent expansion of the thermal rod 104 will cause the end thereof to engage the end of the adjusting screw 103 and unseat the valve 99. The temperature at which the valve 99 is opened, and consequently the temperature at which water is delivered by the faucet, will depend upon the setting of the screw 103, adjustment of which inwardly or outwardly will cause the water to flow from the faucet at a lower or a higher temperature, as will be understood. Should the temperature of the water rise above the predetermined maximum, the consequent expansion of the thermal rod 104 will cause the valve 99 to be depressed to a position in which it will engage the inner end of the cap 101 and close the passage 96, so that the pressures on the opposite sides of the piston 91 will be equalized by leakage about said piston, and the gas valve will close, thereby reducing the heat supplied to the water. This closing of the gas admission valve 76 will result from the stress of the spring 77, as hereinbefore indicated, when the fluid pressure on the normally balanced piston 91 is shut off from below by the closing of the outlet valve 99, as will be understood by the foregoing description. On the other hand, should the temperature of the water in the outflow tube fall below the predetermined minimum, as through a drop in the temperature of the water supplied to the apparatus, or through a diminution of the gas supply, or otherwise, the consequent contraction of the thermal rod will permit the spring 110 to close the thermal valve, thereby checking the flow of water until the temperature thereof again rises. In this manner a state of balance is maintained whereby the flow of water is automatically proportioned to the heat thereof or carried thereby, so that the water flows from the faucet at a constant, predetermined temperature, any variation in the controlling factors, such as temperature or quantity of water supply, gas pressure, etc., causing merely a variation in the rate of flow from the faucet and not in the temperature of the water flowing therefrom. The parts are so proportioned that the maximum area of effective opening of the valve 99 is less than the area of the port 98, so that said valve serves, in a measure, to choke or impede the flow from the outflow tube 42 to the outlet 88. Consequently, when the faucet is open, the pressure in the chamber 111, passage 95, and upper end of the cylinder 92, will always be less than that within the valve 99, passage 96, and lower end of the cylinder 92, so that (except when the passage 96 is closed by the valve 99, as above explained) the piston 91 will be held raised and the gas valve 76 held open, any leakage about the piston 91 being replaced by leakage through the ports 100, which are formed of sufficient size to insure this action. Any accidental failure in the water supply, and consequent drop in pressure in the outflow tube, will result in a balancing of the pressures on the opposite sides of the piston 91, which will result in the depression of said piston by the spring 94 and the closing of the gas valve 76 by its spring 77, immediately extinguishing the burners. When the faucet is closed, the back pressure in the outlet 88 again results in the balancing of the pressures on the piston 91 and the closing of the gas valve. When the burners have been extinguished, the temperature of the water in the outflow tube falls, and the thermal rod contracts, permitting the spring 110 to close the thermal valve, and thereby restoring the parts to the normal or inoperative position, as shown in Fig. 6.

Having thus described my invention I claim and desire to secure by Letters Patent:—

1. In a water heater, the combination with a water chamber, a burner or burners for heating water therein, a spring-closed valve for admitting gas to said burner or burners, an outflow tube communicating with said chamber, a normally seated piston valve for preventing outflow of water from said outflow tube, a thermal rod in said outflow tube, a piston, a cylinder having a chamber in which said piston is movable and which chamber is in communication with the normally closed outflow passage from the heater and which passage opens into said piston chamber at opposite sides of said piston, by suitable ports, so that said piston is normally balanced as to fluid pressure, connections between said gas admission valve and said piston whereby said valve may be opened by said piston when said piston-valve is unseated by expansion of said thermal rod when the fluid pressure at one side of said piston is diminished and the gas admission valve is opened, said piston valve, which closes the discharge passage from said outflow tube, being arranged to close the communicating port to one side of said piston so that the latter will move to permit the said gas admission valve to be closed by its spring when the temperature of the water rises above a desired point.

2. In a water heater, the combination with a water chamber, a burner or burners for heating water therein, a spring-closed valve for admitting gas to said burner or burners, an outflow tube communicating with said chamber and centrally disposed relative thereto, a normally seated piston valve for preventing outflow of water from said outflow tube, a thermal rod in said outflow tube, a piston, a cylinder having a chamber in which said piston is movable and which chamber is in communication with the normally closed outflow passage from the heater and which passage opens into said piston chamber at opposite sides of said piston, by suitable ports, so that said piston is normally balanced as to fluid pressure, connections between said gas admission valve and said piston whereby said valve may be opened by said piston when said piston-valve is unseated by expansion of said thermal rod when the fluid pressure at one side of said piston is diminished and the gas admission valve is opened, said piston valve, which closes the discharge passage from said outflow tube, being arranged to close the communicating port to one side of said piston so that the latter will move to permit the said gas admission valve to be closed by its spring when the temperature of the water rises above a desired point.

3. In a water heater, the combination with a water chamber, a burner or burners for heating water therein, a spring-closed valve for admitting gas to said burner or burners, an outflow tube communicating with said chamber, a normally seated piston valve for preventing outflow of water from said outflow tube, a thermal rod in said outflow tube, a piston, a cylinder having a chamber in which said piston is movable and which chamber is in communication with the normally closed outflow passage from the heater and which passage opens into said piston chamber at opposite sides of said piston, by suitable ports, so that said piston is normally balanced as to fluid pressure, connections between said gas admission valve and said piston whereby said valve may be opened by said piston when said piston-valve is unseated by expansion of said thermal rod when the fluid pressure at one side of said piston is diminished and the gas admission valve is opened, said piston valve, which closes the discharge passage from said outflow tube, being arranged to close the communicating port to one side of said piston, so that the latter will move to permit the said gas admission valve to be closed by its spring when the temperature of the water rises above a desired point, and adjustable means whereby the movements of said outflow-controlling piston valve may be regulated so as to keep the temperature of the heated water at any desired point.

4. In a water heater, the combination with a water chamber, a burner or burners for heating water therein, a spring-closed valve for admitting gas to said burner or burners, an outflow tube communicating with said chamber and centrally disposed relative thereto, a normally seated piston valve for preventing outflow of water from said outflow tube, a thermal rod in said outflow tube, a piston, a cylinder having a chamber in which said piston is movable and which chamber is in communication with the normally closed outflow passage from the heater and which passage opens into said piston chamber at opposite sides of said piston, by suitable ports, so that said piston is normally balanced as to fluid pressure, connections between said gas admission valve and said piston whereby said valve may be opened by said piston when said piston-valve is unseated by expansion of said thermal rod when the fluid pressure one side of said piston is diminished and the gas admission valve is opened, said piston valve, which closes the discharge passage from said outflow tube, being arranged so close the communicating port to one side of said piston so that the latter will move to permit the said gas admission valve to be closed by its spring when the temperature of the water rises above a desired point, and adjustable means whereby the movements of said outflow-controlling piston valve may be regulated so as to keep the temperature of the heated water at any desired point.

5. In a water heater, in combination, a water chamber, means for heating water in said chamber; a casing having a pair of substantially parallel cylinders, inner and outer passages connecting the inner and outer ends of said cylinders, a port communicating with said water chamber and with one of said cylinders adjacent said inner passage, and an outlet communicating with said last-named cylinder adjacent said port and inner passage; a thermally controlled piston valve in said last-named cylinder and adapted to permit leakage of fluid from one end to the other of said cylinder, said valve being movable in one direction to close said port and in the opposite direction to close said outer passage; and means for controlling said heating means comprising a piston in the other of said cylinders and adapted to permit leakage of fluid thereby from one end to the other of its cylinder.

In testimony whereof I affix my signature.

JONATHAN P. SMYTHE.